Figure 1:
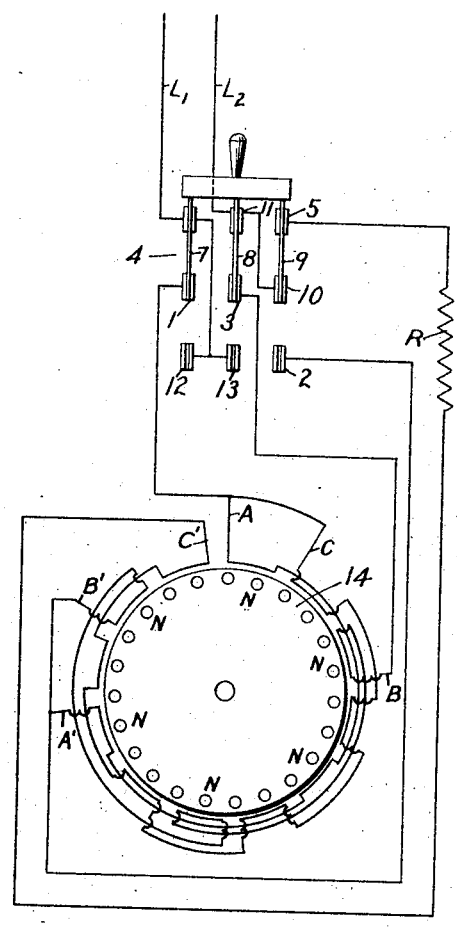

No. 811,644. PATENTED FEB. 6, 1906.
B. G. LAMME.
SINGLE PHASE ALTERNATING CURRENT MOTOR.
APPLICATION FILED FEB. 27, 1904.

WITNESSES:
Fred. H. Miller
Otto S. Schairer

INVENTOR
Benjamin G. Lamme
BY
ATTORNEY.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SINGLE-PHASE ALTERNATING-CURRENT MOTOR.

No. 811,644.

Specification of Letters Patent.

Patented Feb. 6, 1906.

Application filed February 27, 1904. Serial No. 195,684.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Single-Phase Alternating-Current Motors, of which the following is a specification.

My invention relates to alternating-current single-phase motors; and it has for its object to provide a self-starting induction-motor of this class which shall be simple in construction and efficient in operation.

Single-phase alternating-current motors having main primary windings connected directly to the distributing-lines and having auxiliary windings of different time constant from the main windings, which are connected in parallel with the main windings in starting the motor, are well known in the art. Various means have been employed for producing a different time constant in the auxiliary winding from that in the main winding, such as resistance, reactance, and capacity connected in their proper relations with the said windings; but it has generally been found most expedient and economical to employ a comparatively high resistance either in the auxiliary winding itself or connected in series therewith.

Since the main winding has a large amount of self-induction, the current therein lags considerably behind its electromotive force; but on account of the drop in voltage in overcoming the resistance of the auxiliary winding the current and electromotive force are but slightly displaced in phase therein. Hence the currents in the main and auxiliary windings are out of phase with each other, and the motor at starting is practically a polyphase-motor and conforms to the laws governing the starting conditions of such motors. The main winding only is used at speeds approaching synchronism, and the motor becomes then a single-phase machine. With such an arrangement of windings, however, the current absorbed by the main winding in starting is excessive, and my invention is designed to avoid this objection.

It has been found in the operation of single-phase motors that at or near half-speed a motor has considerable torque and that if it could be brought up to approximately half-speed in any way it could then be switched to the simple single-phase condition and would under normal conditions take up the load and pass to full speed. In order to accomplish this, I have divided the main primary winding into two portions or into two sets or groups of coils, which are connected in series in starting the motor and in parallel for running, the current being reversed in one portion of the winding. The number of poles induced in the primary member with the two portions of the winding in series is double the number corresponding to parallel connection of the two portions of the winding. The function of the auxiliary winding remains the same as for the simple case before described, the number of poles induced thereby being equal to the number of poles induced by the main winding when its two portions are connected in series or as for starting conditions.

It may be arranged as desired to manually or automatically cut the auxiliary winding out of circuit and connect the two portions of the main winding in parallel for the smaller number of poles after the motor has attained approximately half-speed or the full speed corresponding to the series connection of the two portions of the main winding. Inasmuch as the motor has a low starting torque, it may sometimes be found necessary to bring it up to approximately full speed before connecting it to its load, which may be done by any suitable means, such as a loose pulley and clutch operated either manually or automatically by centrifugal force.

Figure 2:
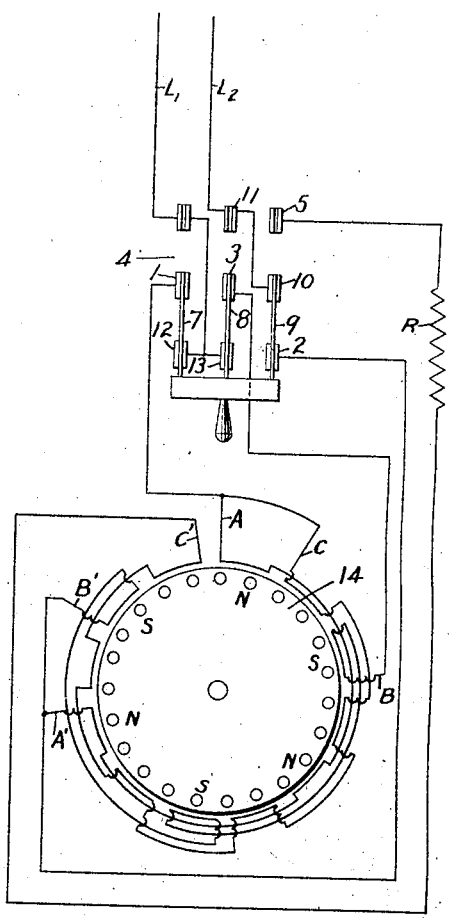

In the accompanying drawings, Figure 1 is a diagrammatic view of the motor-windings arranged and connected for starting conditions of the motor; and Fig. 2 is a similar view showing the windings as arranged and connected for running conditions of the motor, both in accordance with my invention.

A A' and B B' are the terminals of the two portions of the main primary winding which are respectively connected with the contact-terminals 1, 2, 3, and 2 of the double-throw switch 4, and C C' are the terminals of the auxiliary primary winding which are respectively connected with the contact-terminals 1 and 5 of the said switch. An external resistance element R is included in the connection between the terminal C' and the contact-terminal 5; but, as before stated, this resistance may be omitted if the auxiliary winding C C' is composed of high-resistance metal, so that the resistance is in the winding itself. The three-pole double-throw switch 4 represents a simple means for governing the circuits of the primary windings of the motor; but any other suitable device may be employed, if desired.

In Fig. 1 the switch is shown in proper position for connecting the primary windings for starting conditions of the motor or such that the two portions A A' and B B' of the main primary winding are connected in series, and the number of magnetic poles induced thereby is $2^x$, the circuit through them being from the line conductor L' through the switch-blades 7, contact-terminal 1, winding A A', winding B' B, contact-terminal 3, and switch-blade 8, to the line conductor $L^2$. The circuit of the auxiliary winding is from line conductor L', through switch-blade 7, contact-terminal 1, windings C C', resistance R, contact-terminal 5, switch-blade 9, and contact-terminals 10 and 11, to the line conductor $L^2$, the number of poles induced by this winding being also $2^x$.

In Fig. 2 the switch is shown in position for connecting the primary windings in parallel, the current in the winding B B' being reversed in direction from that shown in Fig. 1, and the number of poles being thereby changed from $2^x$ to X. The auxiliary winding and its resistance R are also thrown out of circuit, so that the motor now becomes a simple single-phase machine. Single-phase currents are supplied to the primary windings by means of the circuit from the line conductor L', through the contact-terminal 12, switch-blade 7, contact-terminal 1, winding A A', contact-terminal 2, switch-blade 9, and contact-terminals 10 and 11, to the line conductor $L^2$, and the parallel circuit from L', through contact-terminal 13, switch-blade 8, contact-terminal 3, winding B B', contact-terminal 2, switch-blade 9, and contact-terminals 10 and 11, to the line conductor $L^2$.

The secondary member 14 of the motor may be of the ordinary squirrel-cage type of construction or of any other well-known type.

I claim as my invention—

1. A single-phase induction-motor having a main primary winding comprising two portions, means for connecting said portions in series for starting and in parallel for running and at the same time changing the number of magnetic poles produced by said winding and an auxiliary winding having a different time constant from that of the main winding.

2. A single-phase induction-motor having a main primary winding comprising two portions, means for connecting said portions in series for starting and in parallel for running and at the same time changing the number of magnetic poles produced by said winding and an auxiliary winding having a different time constant from that of the main winding and adapted to produce the same number of magnetic poles as the main winding under starting conditions.

3. A single-phase induction-motor having a main primary winding comprising two portions, means for connecting said portions in series for starting and in parallel for running and at the same time changing the number of magnetic poles produced by said winding and an auxiliary winding having a different time constant from that of the main winding and connected in parallel therewith for starting and which is adapted to produce the same number of magnetic poles as the main winding under starting conditions.

4. A single-phase induction-motor having a main primary winding comprising two portions, means for connecting said portions in series for starting and in parallel for running, the number of magnetic poles produced by said winding being thereby changed from $2^x$ to X, and an auxiliary winding having a different time constant from that of the main winding and adapted to produce $2^x$ magnetic poles under starting conditions.

5. A single-phase induction-motor having a main primary winding comprising two portions, means for connecting said portions in series for starting and in parallel for running, the number of magnetic poles produced by said winding being thereby changed from $2^x$ to X, and an auxiliary winding having a different time constant from that of the main winding, in parallel with which it is connected for starting, and adapted to induce $2^x$ magnetic poles.

In testimony whereof I have hereunto subscribed my name this 12th day of February, 1904.

BENJ. G. LAMME.

Witnesses:
ELISABETH M. STEWART,
BIRNEY HINES.